United States Patent
Yablochnikov et al.

(10) Patent No.: US 7,026,585 B2
(45) Date of Patent: Apr. 11, 2006

(54) METHOD FOR MONITORING THE PERFORMANCE OF A MAGNETIC PULSE FORMING OR WELDING PROCESS

(75) Inventors: Boris A. Yablochnikov, Toledo, OH (US); Aleksey B. Yablochnikov, Toronto (CA)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/938,033

(22) Filed: Sep. 10, 2004

(65) Prior Publication Data

US 2005/0051539 A1    Mar. 10, 2005

Related U.S. Application Data

(60) Provisional application No. 60/501,770, filed on Sep. 10, 2003.

(51) Int. Cl.
*H05B 6/06* (2006.01)
*H05B 6/10* (2006.01)

(52) U.S. Cl. .................. 219/602; 219/617; 219/665; 219/635; 72/56; 29/419.2

(58) Field of Classification Search ........ 219/602–617, 219/665–667, 637–639, 635; 72/56; 29/419.2, 29/518–519
See application file for complete search history.

(56) References Cited

U.S. PATENT DOCUMENTS

| | | | |
|---|---|---|---|
| 3,251,974 A * | 5/1966 | Seyfried | 219/602 |
| 3,267,580 A | 8/1966 | Hohwart et al. | |
| 3,757,071 A * | 9/1973 | Stut | 219/638 |
| 4,075,755 A | 2/1978 | Bernatt et al. | |
| 4,129,846 A | 12/1978 | Yablochnikov | |
| 4,192,534 A | 3/1980 | Bernatt et al. | |
| 4,200,987 A | 5/1980 | Schmitt | |
| 4,807,351 A | 2/1989 | Berg et al. | |
| 4,931,945 A * | 6/1990 | Taguchi et al. | 117/39 |
| 4,962,656 A * | 10/1990 | Kunerth et al. | 72/56 |
| 5,824,998 A | 10/1998 | Livshiz et al. | |
| 5,981,921 A | 11/1999 | Yablochnikov | |
| 6,400,538 B1 | 6/2002 | Kistersky et al. | |
| 2002/0116817 A1 | 8/2002 | Hardesty at al. | |

* cited by examiner

*Primary Examiner*—Philip H. Leung
(74) *Attorney, Agent, or Firm*—MacMillan, Sobanski & Todd, LLC

(57) ABSTRACT

The performance of a magnetic pulse forming or welding process is monitored by positioning a deformation member relative to an inductor coil of the apparatus, then energizing the inductor coil to exert a force thereon. The deformation member can be a plastically deformable tube, and the amount of such plastic deformation that occurs when the inductor coil is energized can be measured to determine the magnitude of the force that is generated by the inductor coil. Alternatively, the deformation member can be an elastically deformable body, and the amount of such elastic deformation that occurs when the inductor coil is energized can be measured to determine the magnitude of the force that is generated by the inductor coil. In both instances, the magnitude of the force that is generated by the inductor coil is representative of the performance of the magnetic pulse forming or welding process and can be used, when necessary, to adjust the parameters of the magnetic pulse forming or welding processes to maintain consistency in the operation thereof.

16 Claims, 5 Drawing Sheets

METHOD FOR MONITORING THE PERFORMANCE OF A MAGNETIC PULSE FORMING OR WELDING PROCESS

CROSS-REFERENCE TO RELATED APPLICATIONS

This application claims the benefit of U.S. Provisional Application No. 60/501,770, filed Sep. 10, 2003, the disclosure of which is incorporated herein by reference.

BACKGROUND OF THE INVENTION

This invention relates in general to the use of magnetic pulse forming techniques that can be used to deform a metallic workpiece to a desired shape. This invention also relates in general to the use of magnetic pulse welding techniques that can be used to permanently secure two metallic workpieces together. In particular, this invention relates to a method and apparatus for monitoring the performance of a magnetic pulse forming process or a magnetic pulse welding process over a period of time and for adjusting the parameters of such magnetic pulse forming or welding processes when necessary to maintain consistency in the operation thereof.

Magnetic pulse forming and magnetic pulse welding are well known processes that can be used in connection with workpieces that are formed from metallic materials. Magnetic pulse forming techniques are typically used to deform a metallic workpiece to a desired shape. Typically, a magnetic pulse forming process is performed by initially disposing a portion of a metallic workpiece either about or within an electromagnetic inductor coil. The inductor coil is then energized by a passing a high-energy pulse of electrical current therethrough so as to generate an intense electromagnetic field either about or within the portion of the workpiece. When this occurs, a large pressure is exerted on the exterior or interior of the workpiece, causing it to deform either inwardly away from the inductor coil (when the inductor coil is disposed about the exterior of the workpiece) or outwardly away from the inductor coil (when the inductor coil is disposed within the interior of the workpiece). If desired, the workpiece may be deformed inwardly into engagement with an inner mandrel or outwardly into engagement with an outer die so that the workpiece is deformed to have a precise desired shape.

Magnetic pulse welding techniques are typically used to permanently secure two metallic workpieces together. Typically, a magnetic pulse welding process is performed by initially disposing two portions of first and second metallic workpieces in a concentric, axially overlapping relationship. Next, the overlapping portions of the first and second metallic workpieces are disposed either about or within an electromagnetic inductor coil. The inductor coil is then energized by a passing a high-energy pulse of electrical current therethrough so as to generate an intense electromagnetic field either about or within the overlapping portions of the first and second workpieces. When this occurs, a large pressure is exerted on one of the first and second workpieces, causing it to move toward the other of the first and second workpieces at a high velocity. If the inductor coil is disposed about the exterior of the two workpieces, then the outer workpiece is deformed inwardly into engagement with the inner workpiece. If, on the other hand, the inductor coil is disposed within the interior of the two workpieces, then the inner workpiece is deformed outwardly into engagement with the outer workpieces. In either event, the high velocity impact of the first and second workpieces cause the two workpieces to become permanently secured together.

As is apparent from the above descriptions, magnetic pulse forming techniques and magnetic pulse welding techniques result in the generation of high energy electromagnetic fields either about or within the workpiece or workpieces. To accommodate the reactance forces that are generated by these high energy electromagnetic fields, it is usually necessary that the inductor coil be manufactured in such a manner as to be very strong from a mechanically standpoint. However, over a period of time, the repeated generation of such reactance forces can cause physical changes to occur in the magnetic pulse forming or welding apparatus. For example, the shape or spatial orientation of the inductor coil can change slightly as a result of the repeated generation of these reactance forces. These physical changes in the magnetic pulse forming or welding apparatus can result in localized changes in the intensity of the electromagnetic field over a period of usage, thus resulting in undesirable variances the stability of the magnetic pulse forming or welding process. Thus, it would be desirable to provide a method and apparatus for monitoring the performance of a magnetic pulse forming process or a magnetic pulse welding process over a period of time and for adjusting the parameters of such magnetic pulse forming or welding processes when necessary to maintain consistency in the operation thereof.

SUMMARY OF THE INVENTION

This invention relates to a method and apparatus for monitoring the performance of a magnetic pulse forming process or a magnetic pulse welding process over a period of time and for adjusting the parameters of such magnetic pulse forming or welding processes when necessary to maintain consistency in the operation thereof. The parameters of such processes can be monitored by positioning a deformation member relative to an inductor coil of the apparatus, then energizing the inductor coil to exert a force thereon. The deformation member can be a plastically deformable tube, and the amount of such plastic deformation that occurs when the inductor coil is energized can be measured to determine the magnitude of the force that is generated by the inductor coil. Alternatively, the deformation member can be an elastically deformable body, and the amount of such elastic deformation that occurs when the inductor coil is energized can be measured to determine the magnitude of the force that is generated by the inductor coil. In both instances, the magnitude of the force that is generated by the inductor coil is representative of the performance of the magnetic pulse forming or welding process and can be used, when necessary, to adjust the parameters of the magnetic pulse forming or welding processes to maintain consistency in the operation thereof.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
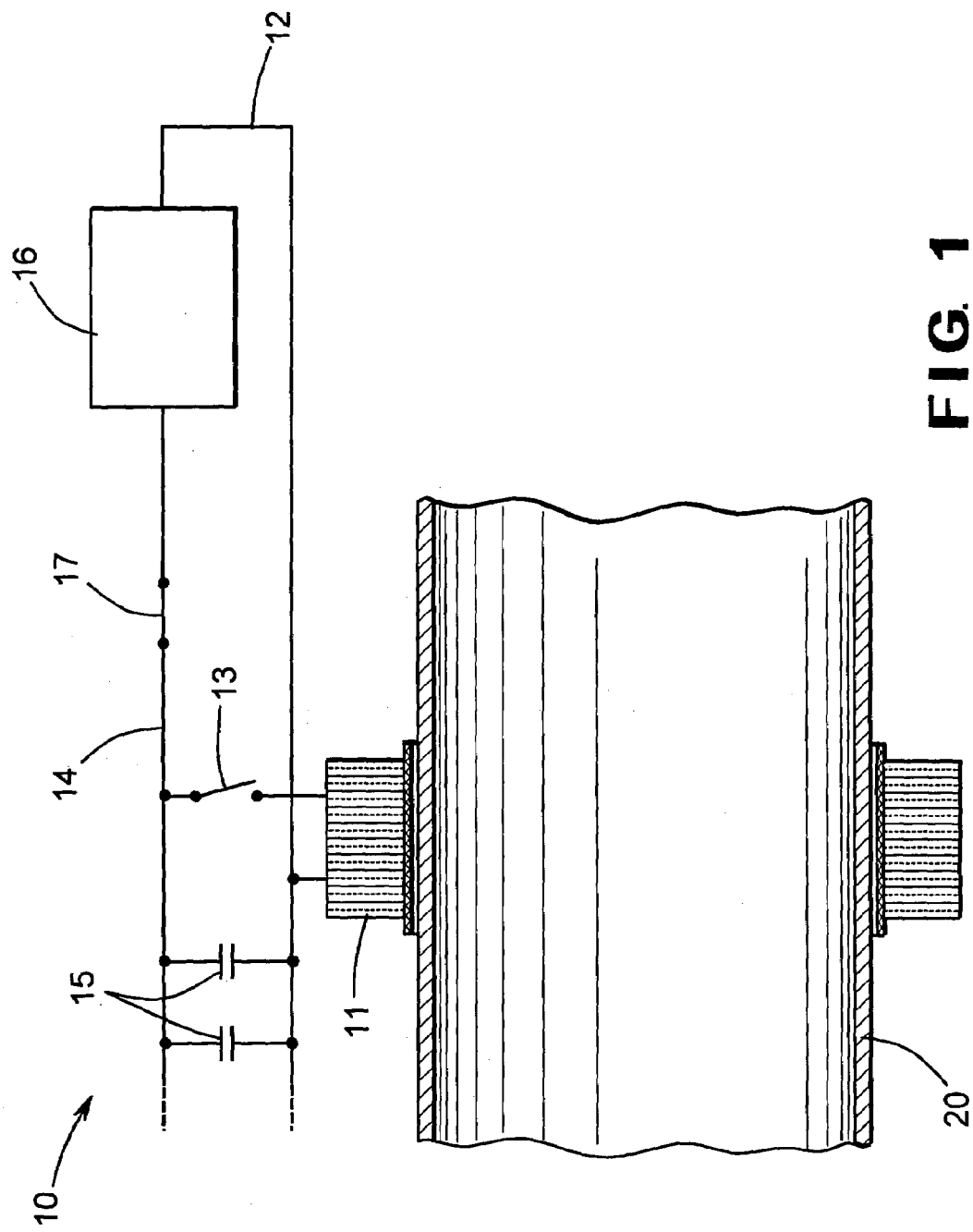
FIG. 1 is a sectional elevational view schematically illustrating an inductor and a control circuit of an apparatus for performing a magnetic pulse forming process or magnetic pulse welding process, together with a first embodiment of a deformation member in accordance with this invention that can be used to monitor the performance of such processes, wherein the first embodiment of the deformation member is shown before the inductor coil has been energized.

Referring now to the drawings, there is illustrated in FIG. 1 a portion of an apparatus, indicated generally at 10, for performing a magnetic pulse forming process or magnetic pulse welding process. The apparatus 10 is, of itself, conventional in the art, and the illustrated apparatus 10 is intended to be representative of any structure for performing a magnetic pulse forming process or magnetic pulse welding process. Thus, the scope of this invention is not intended to be limited for use with the specific apparatus 10 illustrated in FIG. 1. The illustrated apparatus 10 includes an inductor coil 11 that is adapted to be disposed about or within a metallic workpiece (not shown). The inductor coil 11 can be formed having any desired structure, such as that shown and described in U.S. Pat. No. 4,129,846 to Yablochnikov. The disclosure of that patent is incorporated herein by reference.

The inductor coil 11 is connected to a schematically illustrated control circuit for selectively operating same. To accomplish this, a first end of the inductor coil 11 is connected to a first electrical conductor 12, while a second end of the inductor coil 11 is connected through a discharge switch 13 to a second electrical conductor 14. A plurality of high voltage capacitors 15 or other energy storage devices are connected between the first and second electrical conductors 12 and 14. The first electrical conductor 12 is also connected to a source of electrical power 16, while the second electrical conductor 14 is connected through a charging switch 17 to the source of electrical power 16. The structure and operation of the control circuit is described in detail in U.S. Pat. No. 5,981,921 to Yablochnikov, and the disclosure of that patent is also incorporated herein by reference.

Figure 2:
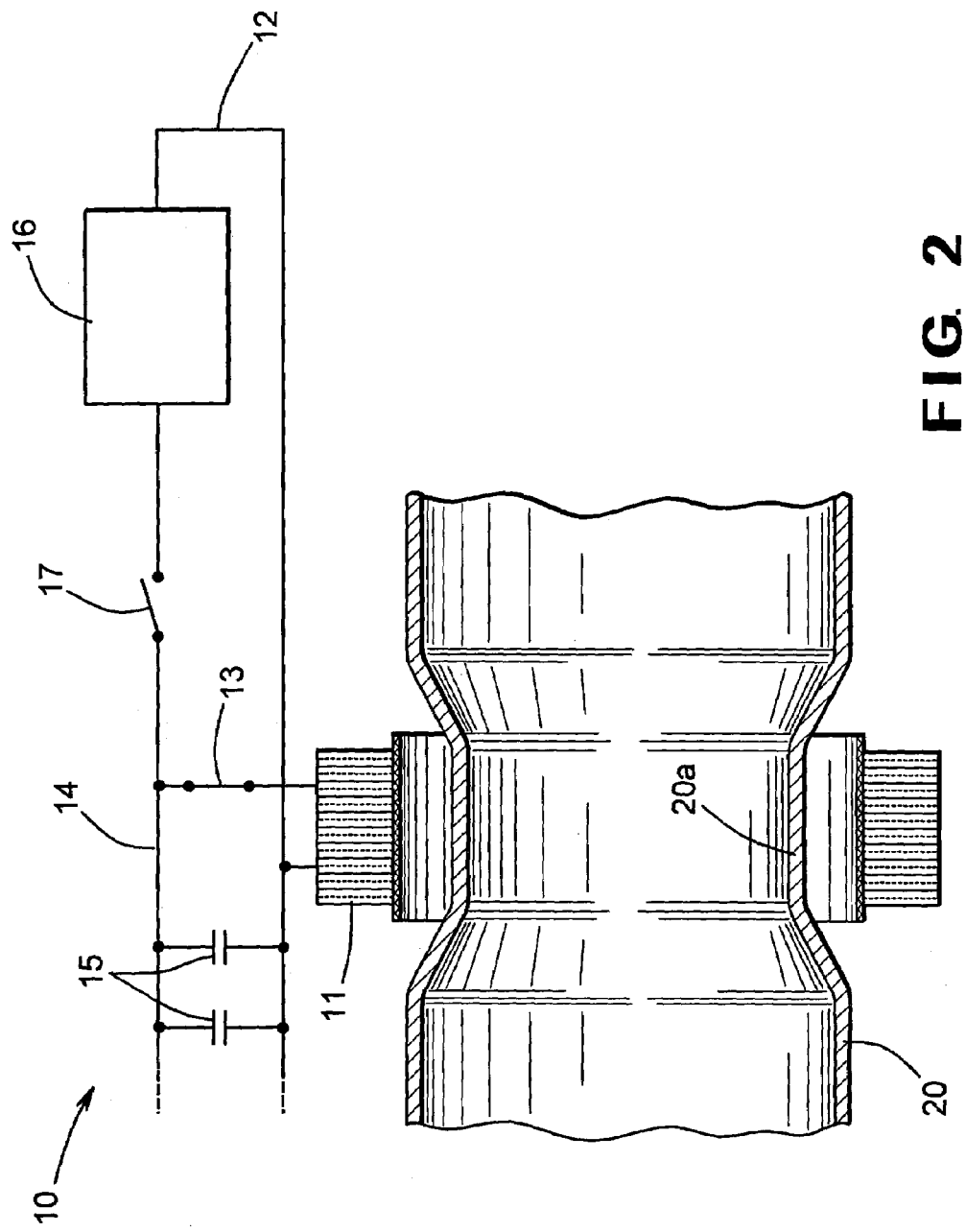
FIG. 2 is a schematic view similar to FIG. 1, wherein the first embodiment of the deformation member is shown after the inductor coil has been energized.

The operation of the inductor coil 11 to perform the magnetic pulse forming process or a magnetic pulse welding process is well known in the art, and reference is again made to the above-referenced patents for a detailed explanation. Briefly, however, the inductor coil 11 is operated by initially opening the discharge switch 13 and closing the charging switch 17, as shown in FIG. 1. This allows electrical energy to be transferred from the source of electrical power 16 to each of the capacitors 15. When the capacitors 15 have been charged to a predetermined voltage, the charging switch 17 is opened, as shown in FIG. 2. Thereafter, when it is desired to energize the inductor coil 11, the discharge switch 13 is closed, as also shown in FIG. 2. As a result, a high energy pulse of electrical current flows from the capacitors 15 through the inductor coil 11, thereby generating an immense and momentary electromagnetic field about or within the workpiece.

In the illustrated embodiment, the inductor coil 11 is sized and shaped to be disposed concentrically about the workpiece. Thus, when the inductor coil 11 is energized and the electromagnetic field is generated, a very large force is exerted on the outer surface of the workpiece, causing it to collapse inwardly away from the inductor coil 11. However, as discussed above, the inductor coil 11 may be sized and shaped to be disposed concentrically within the workpiece. In this instance, when the inductor coil 11 is energized and the electromagnetic field is generated, a very large force is exerted on the inner surface of the workpiece, causing it to expand outwardly away from the inductor coil 11. Depending upon the magnitude of the electromagnetic field that is generated and other factors, the inductor coil 11 may be used either to perform a magnetic pulse forming process, wherein the workpiece is deformed to a desired shape, or a magnetic pulse welding process, wherein two metallic workpieces are permanently secured together, as described in detail above.

As discussed above, both the magnetic pulse forming process and the magnetic pulse welding process result in the generation of high energy electromagnetic fields either about or within the workpiece or workpieces. To accommodate the reactance forces that are generated by these high energy electromagnetic fields, it is usually necessary that the inductor coil 11 be manufactured in such a manner as to be very strong from a mechanical standpoint. However, over a period of time, the repeated generation of such reactance forces can cause physical changes to occur in the magnetic pulse forming or welding apparatus 10. For example, the shape or spatial orientation of the inductor coil 11 can change slightly as a result of these reactance forces. These physical changes in the magnetic pulse forming or welding apparatus 10 can result in localized changes in the intensity of the electromagnetic field over a period of usage, thus resulting in undesirable variances the stability of the magnetic pulse forming or welding process.

In accordance with this invention, a method and apparatus are provided for monitoring the performance of the apparatus 10 as it performs the magnetic pulse forming processes or the magnetic pulse welding processes over a period of time and for adjusting the parameters of such magnetic pulse forming or welding processes when necessary to maintain consistency in the operation of such processes. In essence, the method and apparatus of this invention are effective to periodically measure the magnitudes of the forces that are generated by the electromagnetic field on the workpiece and to compare such measurements in order to determine if changes occur in the intensity of the electromagnetic field. If any such changes occurs, the operation of the apparatus 10 can be adjusted to compensate therefor.

FIG. 1 illustrates a first embodiment of a deformation member 20 that can be used in accordance with this invention to monitor the performance of the magnetic pulse forming or welding apparatus 10. The deformation member 20 is initially disposed concentrically within the illustrated inductor coil 11, as shown in FIG. 1. Alternatively, if the inductor coil 11 is sized and shaped to be disposed concentrically within the workpiece as described above, then the deformation member 20 can be initially disposed concentrically about the inductor coil 11. In either event, the deformation member 20 can be embodied as any structure that is capable of being deformed by the apparatus 10 when the inductor coil 11 is energized in the manner described above. In the illustrated embodiment, the deformation member 20 is embodied as a hollow cylindrical tube that is formed from a metallic material.

In the next step of the method of this invention, the apparatus 10 is operated so as to energize the inductor coil 11 in the manner described above. As a result, the portion of the deformation member 20 that is disposed within the inductor coil 11 is deformed radially inwardly, such as shown at 20a in FIG. 2. The amount of such deformation of the deformed portion 20a will depend upon the overall performance of the apparatus 10. If the apparatus 10 generates an electromagnetic field of relatively high intensity, then the magnitudes of the forces exerted on the deformation member 20 will be relatively large, resulting in a relatively large amount of deformation. If, on the other hand, the apparatus 10 generates an electromagnetic field of relatively low intensity, then the magnitudes of the forces exerted on the deformation member 20 will be relatively small, resulting in a relatively small amount of deformation. By measuring the amount of deformation that occurs in the deformed portion 20a of the deformation member 20, a determination can be made as to the strength of the electromagnetic field generated by the inductor coil 11.

Figure 3:
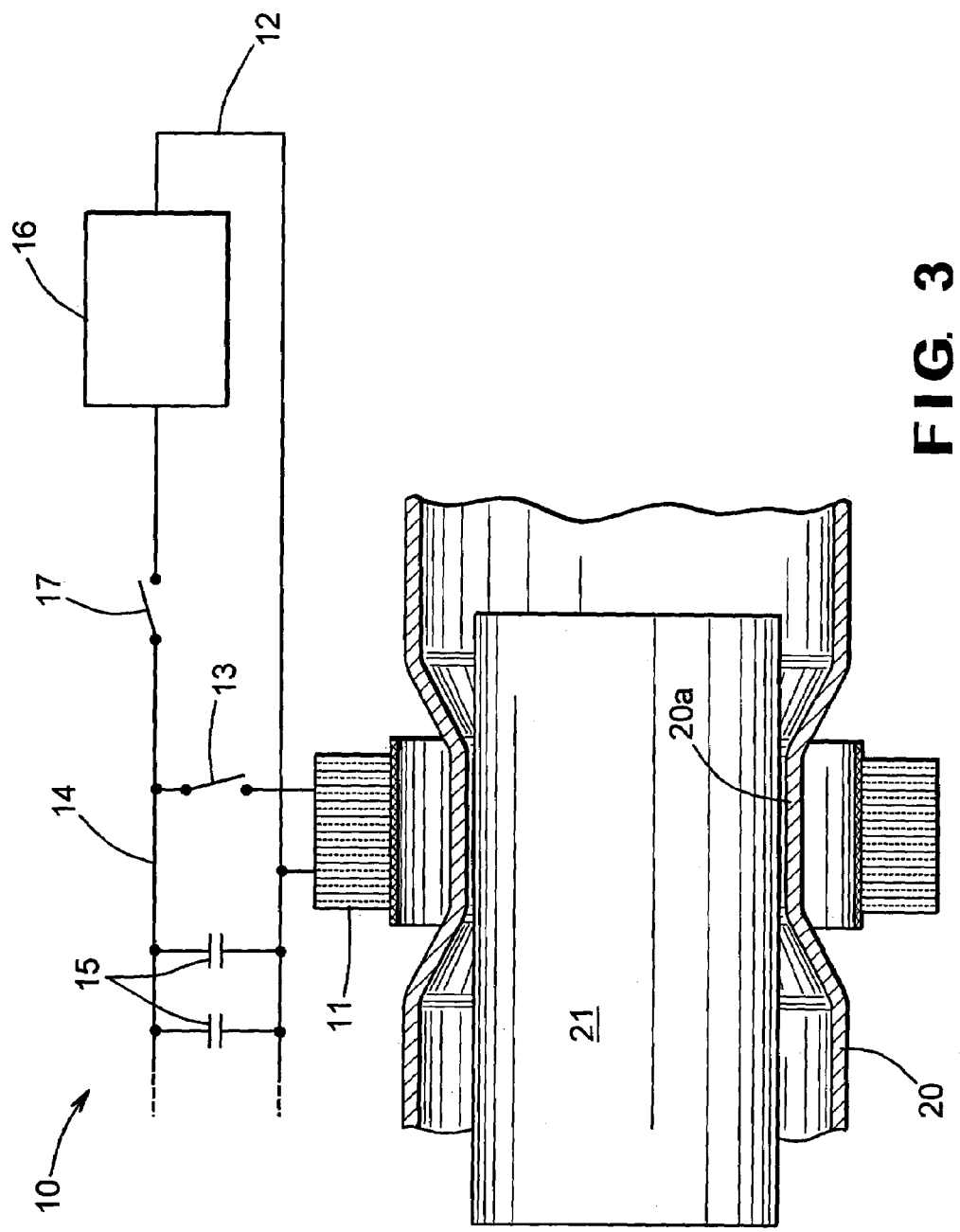
FIG. 3 is a schematic view similar to FIG. 2, wherein a measurement gauge is shown inserted within the first embodiment of the deformation member.

The amount of deformation that occurs in the deformed portion 20a of the deformation member 20 can be measured in any desired manner. For example, as shown in FIG. 3, a simple measurement gauge 21 can be inserted within the deformation member 20 to determine the amount of deformation that has occurred. The gauge 21 is conventional in the art and can be embodied as any structure having a predetermined size or shape. When inserted within the deformed portion 20a of the deformation member 20, the gauge 21 can provide a pass/no pass indication of the magnitude of the internal dimension of the deformed portion 20a of the deformation member 20. Because the internal configuration of the deformed portion 20a of the deformation member 20 may be non-uniform, the evaluation of its internal dimension is preferably accomplished using a gauge 21 having a cylindrical outer surface.

If the gauge 21 cannot pass through the deformed portion 20a of the deformation member 20, then it can be determined that the strength of the electromagnetic field generated by the inductor coil 11 is sufficiently strong as to insure that the magnetic pulse forming process or the magnetic pulse welding process is being performed properly. In this instance, use of the apparatus 10 can be continued in the normal manner without adjustment. If, on the other hand, the gauge 21 can pass through the deformed portion 20a of the deformation member 20 (or alternatively pass through the deformed portion 20a of the deformation member 20 with a substantial amount of play therebetween), then it can be determined that the strength of the electromagnetic field generated by the inductor coil 11 is not sufficiently strong as to insure that the magnetic pulse forming process or the magnetic pulse welding process is being performed properly. In this instance, it may be necessary or desirable to adjust one or more of the above-described components of the apparatus 10 to increase the strength of the electromagnetic field generated by the inductor coil 11 before continuing in the normal manner. This adjustment of the components of the apparatus 10 can be accomplished in any desired manner, including increasing the power supplied by the source of electrical power 16, varying the capacitance of the bank of capacitors 15, and the like.

Alternatively, a plurality of different sized gauges (not shown) can be used to precisely measure the internal dimension of the deformed portion 20a of the deformation member 20. By using a plurality of different sized gauges, more precise information regarding the strength of the electromagnetic field generated by the inductor coil 11 can be collected. For example, instead of a simple pass/no pass determination of the strength of the electromagnetic field generated by the inductor coil 11, the use of a plurality of differently sized gauges would allow the strength of the electromagnetic field generated by the inductor coil 11 to be more precisely quantified. This, in turn, would allow more informative decisions to be made regarding the operation of the apparatus 10. For example, the use of a plurality of differently sized gauges would allow a determination to be made that even though the apparatus 10 is functioning within acceptable parameters, the strength of the electromagnetic field generated by the inductor coil 11 is degrading over a period of time. As a result, adjustments to the apparatus 10 can be anticipated and corrected before a failure mode is reached. Also, the use of a plurality of differently sized gauges would facilitate the use of other process monitoring tools, such as statistical process controls and the like.

In the above-described embodiment of this invention, it can be seen that the deformation member 20 is plastically deformed as a result of the energization of the inductor coil 11. In other words, the deformation member 20 is deformed to such an extent that the deformed portion 20a retains its deformed shape after the inductor coil 11 is ceased to be energized. However, such plastic deformation of the deformation member 11 is not required. On the contrary, as will be explained in greater detail below, the inductor coil 11 can be energized to cause only elastic deformation of the deformation member 11, wherein the deformation member 30 is deformed to such an extent that the deformed portion returns to its original shape after the inductor coil 11 is ceased to be energized.

Figure 4:
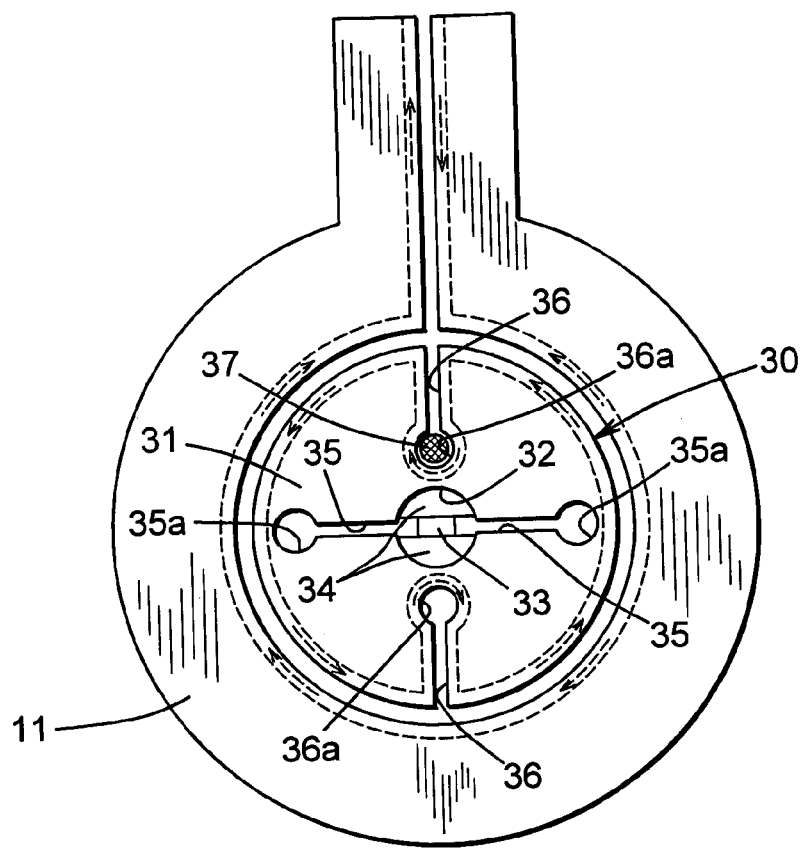
FIG. 4 is an end elevational view schematically illustrating the inductor of the apparatus for performing a magnetic pulse forming process or magnetic pulse welding process illustrated in FIG. 1, together with a second embodiment of a deformation member in accordance with this invention that can be used to monitor the performance of such processes.

Referring now to FIG. 4, the inductor 11 of the apparatus 10 for performing a magnetic pulse forming process or magnetic pulse welding process is illustrated with a second embodiment of a deflection member, indicated generally at 30, that can be used in accordance with this invention to monitor the performance of such processes. In this second embodiment, energization of the inductor coil 11 causes only elastic deformation of the deformation member 30. In other words, the deformation member 30 is deformed to such an extent that the deformed portion returns to its original shape after the inductor coil 11 is ceased to be energized.

The second embodiment of the deformation member 30 includes a body 31 having an opening 32 formed therein. In the illustrated embodiment, the body 31 is generally cylindrical in shape, and the opening 32 extends throughout the longitudinal axis of the body 31. However, the body 31 of the deformation member 30 may be formed having any desired shape, and the opening 32 may be formed in any desired location or orientation within the body 31. A sensor 33 is disposed within the central opening 32 of the body 31 of the deformation member 30. The sensor 33 can be embodied as any conventional displacement, force, strain, pressure, or other sensing device that is responsive to the application of force to the body 31 of the deformation member 30 for generating a signal that is representative of the magnitude thereof. For example, the sensor 33 can be embodied as a conventional piezo-electric sensor.

The deformation member 30 is initially disposed concentrically within the inductor coil 11, as shown in FIG. 4. Next, the apparatus 10 is operated so as to energize the inductor coil 11 in the manner described above. As a result, the portion of the deformation member 30 that is disposed within the inductor coil 11 is elastically deformed radially inwardly, resulting in compressive forces being exerted on the sensor 33. As discussed above, the amount of such deformation and compressive forces will depend upon the overall performance of the apparatus 10. If the apparatus 10 generates an electromagnetic field of relatively high intensity, then the magnitudes of the forces exerted on the deformation member 30 will be relatively large, resulting in a relatively large amount of deformation. If, on the other hand, the apparatus 10 generates an electromagnetic field of relatively low intensity, then the magnitudes of the forces exerted on the deformation member 30 will be relatively small, resulting in a relatively small amount of deformation. The sensor 33 is responsive to the magnitude of such deformation for generating the signal that is representative thereof. This sensor signal is, therefore, representative of the strength of the electromagnetic field generated by the inductor coil 11. Thus, the sensor signal can be used in the manner described above to monitor the performance of the magnetic pulse forming or welding process and, when necessary, to adjust the apparatus 10 or the other parameters of the magnetic pulse forming or welding processes to maintain consistency in the operation thereof.

If desired, the sensor 33 can be supported within the opening 32 of the body 31 by one or more inserts 34. In the illustrated embodiment, two of such supporting inserts 34 are provided about the sensor 33 within the opening 32. Preferably, the abutting surfaces of the interior of the opening 32 and the supporting inserts 34 engage one another so as to establish a pre-loading force against the sensor 33. This mechanical pre-loading force not only assures that the various components of the deformation member 30 are properly assembled together, but also functions to minimize or eliminate any small gaps that might be present in the abutting surfaces that could result in incorrect readings by the sensor 33. Preferably, either or both of the abutting surfaces of the interior of the opening 32 and either or both of the supporting inserts 34 are tapered so as to facilitate the establishment of a precise magnitude of this pre-loading force against the sensor 33, although such is not required.

It may be desirable to enhance the flexibility of the deformation member 30 so that portions of the body 31 will be more greatly deformed in response to the application of force thereto. Such additional deformation of the body 31 can facilitate the measurement of the magnitude of such forces by the sensor 33 supported therein. To accomplish this, one or more slits or other openings may be formed in the body 31 thereof. In the illustrated embodiment, a first pair of opposed slits 35 are formed in the body 31 of the deformation member 30, each extending generally radially outwardly from the central opening 32 and terminating in an enlarged area 35a that is located near the outer surface of the body 31. Similarly, a second pair of opposed slits 36 are formed in the body 31 of the deformation member 30, each extending generally radially inwardly from the outer surface of the body 31 and terminating in an enlarged area 36a that is located near the central opening 32. The slits 35 and 36 enhance the flexibility of the deformation member 30 so that portions of the body 31 will be more greatly deformed in response to the application of force thereto.

If desired, a sensor may be provided to directly measure the magnitude of the electromagnetic field that is generated by the inductor coil 11. In the illustrated embodiment, a conventional induction gauge 37 is disposed within the enlarged area 36a of one of the slits 36. If desired, however, the induction gauge 37 may be disposed at any other desired location. The induction gauge 37 is adapted to generate a signal that is representative of the magnitude of the electromagnetic field that is generated by the inductor coil 11 when energized. The signal from the induction gauge 37 may be helpful in interpreting the results of the deformation measurement.

Figure 5:
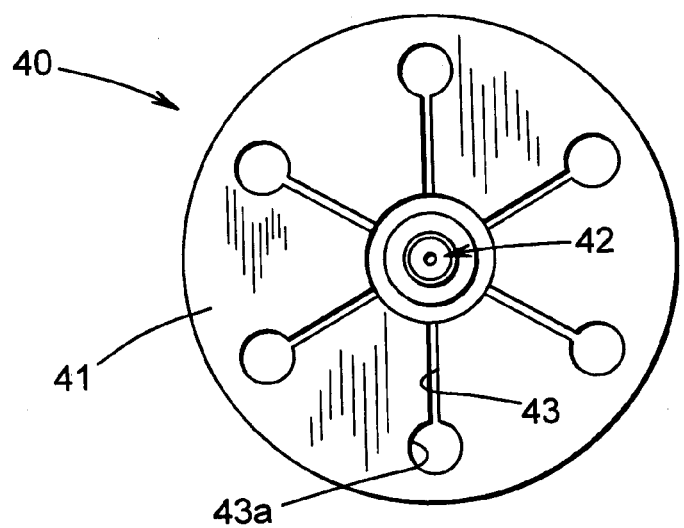
FIG. 5 is an end elevational view similar to FIG. 4 of a third embodiment of a deformation member in accordance with this invention.

FIG. 5 is an end elevational view similar to FIG. 4 of a third embodiment of a deflection member, indicated generally at 40, in accordance with this invention. The third embodiment of the deformation member 40 includes a body 41 having an opening (not shown) formed therein. In the illustrated embodiment, the body 41 is generally cylindrical in shape, and the opening extends throughout the longitudinal axis of the body 41. However, the body 41 of the deformation member 40 may be formed having any desired shape, and the opening may be formed in any desired location or orientation within the body 41. A sensor, indicated generally at 42, is disposed within the central opening of the body 41 of the deformation member 40. The sensor 42 can be embodied as any conventional displacement, force, strain, pressure, or other sensing device that is responsive to the application of force to the body 41 of the deformation member 40 for generating a signal that is representative of the magnitude thereof.

It may be desirable to enhance the flexibility of the deformation member 40 so that portions of the body 41 will be more greatly deformed in response to the application of force thereto. Such additional deformation of the body 41 can facilitate the measurement of the magnitude of such forces by the sensor 42 supported therein. To accomplish this, one or more slits or other openings may be formed in the body 41 thereof. In the illustrated embodiment, a plurality of slits 43 are formed in the body 41 of the deformation member 40, each extending generally radially outwardly from the central opening and terminating in an enlarged area 43a that is located near the outer surface of the body 41. In the illustrated embodiment, six of such slits 43 are equidistantly formed about the deformation member 40. The slits 43 enhance the flexibility of the deformation member 40 so that portions of the body 41 will be more greatly deformed in response to the application of force thereto. Otherwise, the deformation member 40 functions in the same manner as the deformation member described above.

Figure 6:
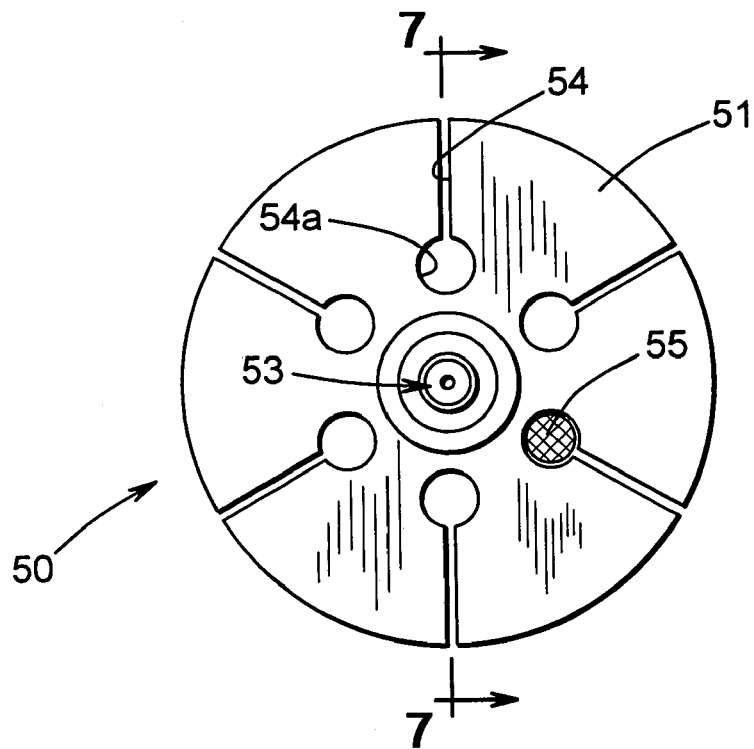
FIG. 6 is an end elevational view similar to FIG. 5 of a fourth embodiment of a deformation member in accordance with this invention.

FIG. 6 is an end elevational view similar to FIG. 4 of a fourth embodiment of a deflection member, indicated generally at 50, in accordance with this invention. The fourth embodiment of the deformation member 50 includes a body 51 having an opening 52 (see FIG. 7) formed therein. In the illustrated embodiment, the body 51 is generally cylindrical in shape, and the opening 52 extends throughout the longitudinal axis of the body 51. However, the body 51 of the deformation member 50 may be formed having any desired shape, and the opening 52 may be formed in any desired location or orientation within the body 51. A sensor, indicated generally at 53, is disposed within the central opening 52 of the body 51 of the deformation member 50. The sensor 53 can be embodied as any conventional displacement, force, strain, pressure, or other sensing device that is responsive to the application of force to the body 51 of the deformation member 50 for generating a signal that is representative of the magnitude thereof. The structure of the sensor 53 will be described in further detail below.

It may be desirable to enhance the flexibility of the deformation member 50 so that portions of the body 51 will be more greatly deformed in response to the application of force thereto. Such additional deformation of the body 51 can facilitate the measurement of the magnitude of such forces by the sensor 53 supported therein. To accomplish this, one or more slits or other openings may be formed in the body 51 thereof. In the illustrated embodiment, a plurality of slits 54 are formed in the body 51 of the deformation member 50, each extending generally radially inwardly from the outer surface of the body 51 and terminating in an enlarged area 54a that is located near the central opening 52. In the illustrated embodiment, six of such slits 54 are equidistantly formed about the deformation member 50. The slits 54 enhance the flexibility of the deformation member 50 so that portions of the body 51 will be more greatly deformed in response to the application of force thereto. Otherwise, the deformation member 50 functions in the same manner as the deformation member described above.

If desired, a sensor may be provided to directly measure the magnitude of the electromagnetic field that is generated by the inductor coil 11. In the illustrated embodiment, a conventional induction gauge 55 is disposed within the enlarged area 54a of one of the slits 54. The induction gauge 55 is adapted to generate a signal that is representative of the magnitude of the electromagnetic field that is generated by the inductor coil 11 when energized. The signal from the induction gauge 55 may be used in the manner described above.

Figure 7:
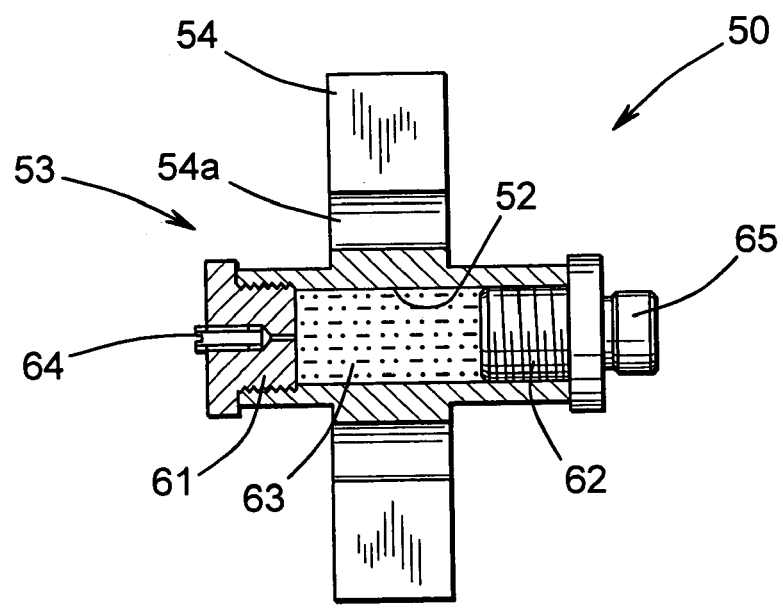
FIG. 7 is a sectional elevational view of the fourth embodiment of the deformation member taken along line 7—7 of FIG. 6.

Referring to FIG. 7, the structure of the sensor 53 is illustrated in detail. As shown therein, the sensor 53 includes a pair of plugs 61 and 62 that close the ends of the central opening 52 formed through the body 51 of the deformation member 50 to define a chamber that contains a quantity of a fluid 63. A valve 64, such as a conventional check valve, is provided in the first plug 61 for facilitating the insertion of the fluid 63 within the chamber. A sensor 65, such as a conventional fluid pressure sensor, is provided in the second plug 62 for measuring the pressure of the fluid 63 contained within the chamber, which will vary in accordance with deformations of the deformation member 50 as described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for performing a magnetic pulse forming process or a magnetic pulse welding process comprising the steps of:
   (a) disposing a workpiece relative to an inductor coil;
   (b) performing a magnetic pulse forming process or a magnetic pulse welding process by energizing the inductor coil to deform the workpiece; and
   (c) subsequent to step (b), determining if the performance of the magnetic pulse forming process or the magnetic pulse welding process has caused a change in the inductor coil by (1) disposing a deformation member relative to the inductor coil; (2) energizing the inductor coil to deform the deformation member; (3) measuring the amount of deformation that occurs in the deformation member; and (4) determining the performance of the inductor coil in response to the amount of deformation in the deformation member.

2. The method defined in claim 1 wherein said step (c)(1) is performed by disposing the deformation member either within or about the inductor coil.

3. The method defined in claim 1 wherein said step (c)(2) is performed by energizing the inductor coil to plastically deform the deformation member to have a deformed portion.

4. The method defined in claim 3 wherein said step (c)(3) is performed by measuring a dimension of the deformed portion.

5. The method defined in claim 4 wherein said step (c)(3) is performed by using a measurement gauge to measure a dimension of the deformed portion.

6. The method defined in claim 1 wherein said step (c)(2) is performed by energizing the inductor coil to elastically deform the deformation member to have a deformed portion.

7. The method defined in claim 6 wherein said step (c)(3) is performed by measuring a dimension of the deformed portion.

8. The method defined in claim 7 wherein said step (c)(3) is performed by using a sensor to measure a dimension of the deformed portion.

9. The method defined in claim 1 including the further step (d) of adjusting the operation of the inductor coil when it is determined that the performance of the inductor coil is not sufficient to insure that the magnetic pulse forming process or the magnetic pulse welding process is being performed properly.

10. The method defined in claim 1 wherein said step (c)(1) is performed by providing a deformation member that is tubular in shape.

11. The method defined in claim 1 wherein said step (c)(1) is performed by providing a deformation member that is cylindrical in shape.

12. The method defined in claim 11 wherein said step (c)(1) is performed by providing a deformation member having an opening formed therein, and wherein said step (c)(3) is performed by providing a sensor in said opening to measure a dimension of the deformed portion.

13. The method defined in claim 11 wherein said step (c)(1) is performed by providing a deformation member having at least one slit formed therein.

14. The method defined in claim 11 wherein said step (c)(1) is performed by providing a deformation member having a plurality of slits formed therein.

15. The method defined in claim 1 wherein said step (c)(2) is performed by applying a pulse of electrical current to the inductor coil.

16. The method defined in claim 1 including the further step (d) of adjusting parameters of the magnetic pulse forming process or a magnetic pulse welding process in accordance with the performance of the inductor coil.

* * * * *